US005342670A

United States Patent [19]

Dominguez et al.

[11] Patent Number: 5,342,670

[45] Date of Patent: Aug. 30, 1994

[54] PROCESS FOR SIMULATING A CHAOTIC PATTERN ON A SURFACE BY APPLYING TO THE SURFACE A NONUNIFORM MULTILAYERED COATING

[76] Inventors: Rafael Dominguez; Tina M. Dominguez, both of 6350 Thomas St., Hollywood, Fla. 33024

[21] Appl. No.: 164,445

[22] Filed: Dec. 9, 1993

[51] Int. Cl.[5] .......... B32B 3/00; B05D 5/06

[52] U.S. Cl. .......... 428/161; 427/268; 427/270

[58] Field of Search .......... 427/262, 263, 264, 267, 427/268, 270, 274, 277; 428/142, 161, 172

[56] References Cited

U.S. PATENT DOCUMENTS

| | | | |
|---|---|---|---|
| 9,255 | 9/1852 | Tucker . | |
| 506,394 | 10/1893 | Goldsmith . | |
| 1,516,466 | 11/1924 | Gage | 427/264 |
| 4,217,378 | 8/1980 | Pizur, Sr. | 427/259 |
| 4,946,715 | 8/1990 | Avers | 427/273 |
| 5,034,084 | 7/1991 | Schäfer | 156/278 |
| 5,127,395 | 6/1992 | Sandor | 427/262 |

FOREIGN PATENT DOCUMENTS

| | | | |
|---|---|---|---|
| 63-194949 | 8/1988 | Japan | 428/142 |

*Primary Examiner*—Terry J. Owens
*Attorney, Agent, or Firm*—Richard C. Litman

[57] ABSTRACT

A process for simulating the appearance of marble in an array of colors on a smooth paintable surface at room temperature by preparing the surface to receive paint, applying a base coat of black lacquer paint, applying a coat of iridescent paint, applying a flexible sheet such as plastic wrap to the iridescent coat while still wet, immediately removing the flexible sheet leaving a three-dimensional impression, applying a translucent or candy color coat, and finally a clear coat.

11 Claims, 3 Drawing Sheets

PROCESS FOR SIMULATING A CHAOTIC PATTERN ON A SURFACE BY APPLYING TO THE SURFACE A NONUNIFORM MULTILAYERED COATING

BACKGROUND OF THE INVENTION

1. Field of the Invention

The present invention relates to a process for creating a painted surface. More specifically, the present invention relates to process for creating a painted surface with nonuniform coating patterns.

2. Description of the Prior Art

Chaotic patterns found in nature have always been aesthetically pleasing, and accordingly coveted for their appearance. The simulation of chaotic patterns, such as those naturally found in marble, jade, or quartz, on surfaces of articles has been performed for centuries to enhance the attractiveness of articles of manufacture, or to create an illusion of the physical properties of the material simulated for materials which do not have these properties. These simulations traditionally require artistic discretion and technique in their production, sometimes so intensive, that the simulated objects acquire greater value than an analogous object of the material being simulated.

Processes which create these simulations inexpensively and with readily available materials have been hard sought in the prior art to mixed results. For example, U.S. Pat. No. 9,255 to Tucker discloses a process for preparing an imitation marble surface on slate or like mineral matter by burning oil onto the surface to form indurations thereon, applying a color coating on these indurations, painting the whole surface with black or japanning, then grinding down the surface to reveal the colored indurations.

U.S. Pat. No. 506,394 to Goldsmith discloses a process for decorating surfaces by applying multiple coats of different colors to an object, then subjecting the object to motion prior to the drying of the coats.

U.S. Pat. No. 4,217,378 to Pizur discloses a method for producing a patterned coating on a rigid planar surface by heat distorting a flexible plastic film, which is placed on a surface having applied thereto a first liquid coating, compressing the film to the surface, allowing the coating to dry, removing the film, then optionally applying a second contrasting coating.

U.S. Pat. No. 4,946,715 to Avera discloses a method for producing a faux marble finish on metal and other non-porous surfaces by applying a coat of oil based paint to the surface, spattering a solvent for the oil based paint onto the coat prior to the coat drying, and inducing a random flow of the solvent through the paint coat.

U.S. Pat. No. 5,034,084 to Schäfer discloses a method of coating sheet-like materials, such as wooden boards by pressing a support sheet impregnated with two superimposed layers of resin at the melting point of the resin to the sheet-like material. A flake or scale-like pigment is present in the layer adjacent the support sheet.

U.S. Pat. No. 5,122,395 to Sandor discloses a method for producing faux finishes on color absorbent surfaces by applying randomly one or more aqueous colorants to the surface, then scattering volatile organic liquids on the colorants, causing mobilization of the colorants on the surface.

None of the above inventions and patents, taken either singly or in combination, is seen to describe the instant invention as claimed.

SUMMARY OF THE INVENTION

The present invention is a process for simulating the appearance of marble, and other natural or paranatural patterned material in an array of colors on a paintable surface. The process involves preparing the surface to receive paint, applying a base coat of black paint, applying a coat of iridescent paint, applying a flexible sheet to the iridescent coat while still wet, immediately removing the flexible sheet thereby producing a three-dimensional impression, applying a color coat of translucent or candy pigment, and finally a clear coat. The entire process may be carried out at room temperature, and may advantageously use all readily available materials.

Accordingly, it is a principal object of the invention to provide a process for producing a multi-layered nonuniform coating on articles which simulates chaotic natural and paranatural surfaces such as marble.

It is another object of the invention to provide a process which can be performed at substantially room temperature with easily accessible materials.

It is a further object of the invention to provide a process which may be performed without extensive subjective artistic decision making.

Still another object of the invention is to provide a distinctive nonuniform coating which is easily produced, yet never completely and identically reproducible.

These and other objects of the present invention will become readily apparent upon further review of the following description and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT(S)

The present invention provides a process and product by process which may be applied to any paintable surface, including leather, plastic, metal, wood, glass, or stone, of substantially any article, manufactured or naturally occurring, to give the surface an aesthetically pleasing and desirable chaotic patterning.

The surface 1 of the article to be treated is prepared. If required, the surface is cleaned with detergent solution or thinner, such as a lacquer thinner. Preferably a mild reducing solvent is used to remove any grease, oil, and/or adhesives from the surface. The surface is then prepared to receive paint. Preferably, smooth surfaces are roughened or abraded slightly, such as by wet sanding. A very fine grade of hydrated sandpaper is most preferred. Any exposed areas not to be treated by the present process are masked or otherwise protected. For instance, tape, paper, shields, or skirts are placed over these areas. Preferably, the masking is done with tape, with or without paper, depending on the size of the area to be excluded from the effect of the present process.

Figure 1:
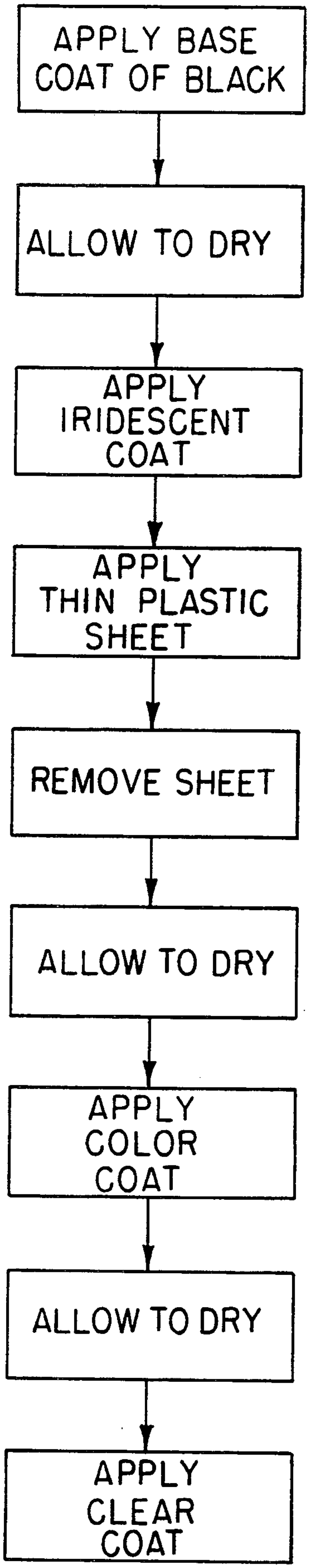
FIG. 1 depicts general process steps of the present invention in a flowchart.
Figure 3:
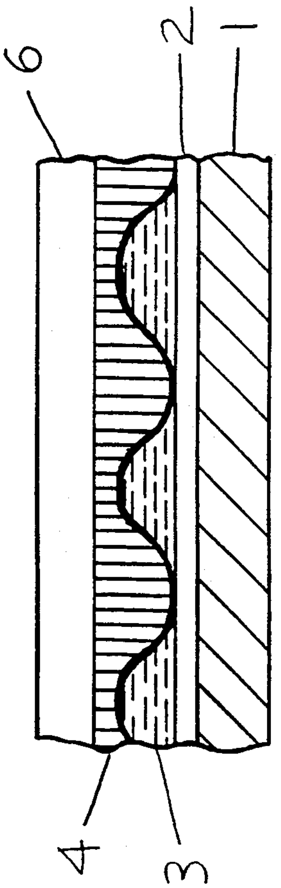
FIG. 3 is a schematized side sectional view of the various coats that result from the present process.
Figure 2:
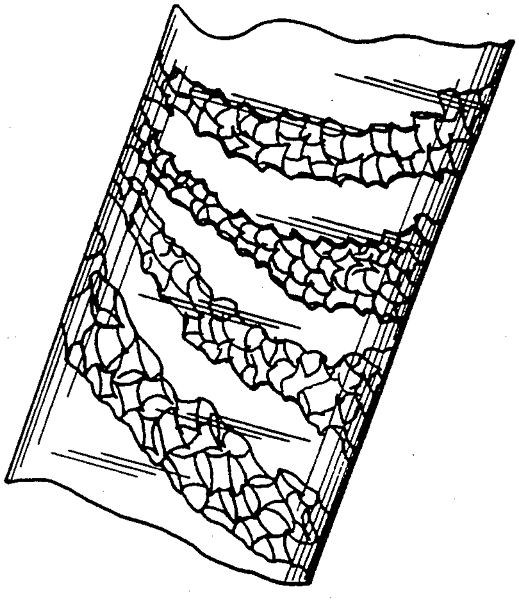
FIG. 2 is a partial perspective view of the surface on an ultimate final product of the present process.
Figure 4:
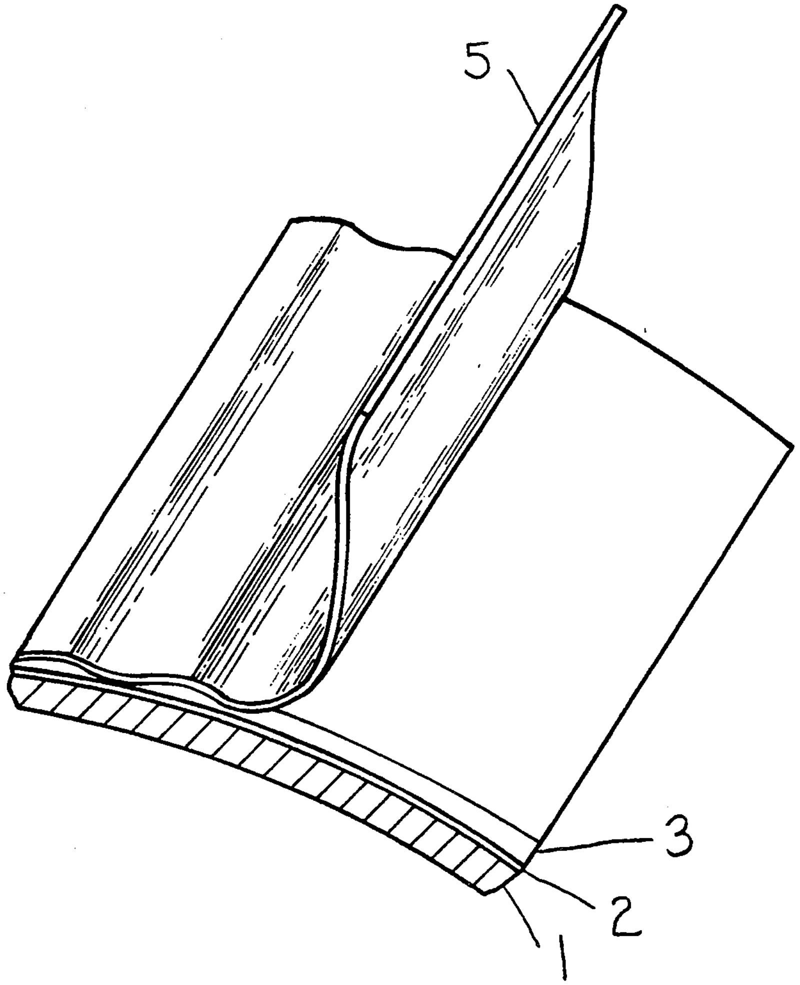
FIG. 4 is a partial perspective view of one step of the present process which shows the application of a plastic sheet to a wet coat of iridescent paint.

Thus prepared, the article to be treated is subjected to the process of the present invention as depicted in FIG. 1. First, a layer of flat black lacquer base is applied to the surface 1 of the article and allowed to dry. The lacquer may be applied by any appropriate means, such as by spraying, brushing, or immersion. Spray application is preferred. The thickness of the coat may be from about 0.1 to 1 mm, preferably 0.25–0.5 mm, or roughly the thickness which is the result of the application of one complete coat. Though other dark colors may be used, black is most preferred as black lacquer is readily available, and provides the most contrast when practicing the present invention. This layer will be referred to as the base coat 2, and may be best seen in FIGS. 3 and 4. The base coat 2 forms the foundation for the design.

A layer of iridescent paint is then applied to the base coat. Iridescent paints are those which have pigments of a metallic appearance, and are typically silver, gold, or tinted variations thereof in color. Preferably a silver or gold enamel is used, and most preferably, a silver urethane acrylic enamel. The iridescent paint may be applied by any appropriate means, as with the base coat above. Preferably, spray application is used. This layer will be referred to as the iridescent coat 3 and preferably applied in a thickness of the same range as the base coat.

Before iridescent coat 3 dries, at least one thin flexible sheet of material 5 is applied to the complete surface area covered by wet paint. Slight pressure may be applied if necessary to insure complete coverage. The sheet is then immediately removed in a direction substantially perpendicular to the surface of the article, and the iridescent coat 3 is allowed to dry. The resultant randomly imprinted surface will feature chaotic patterns of iridescent paint in three-dimensional conformations upon areas of base coat 2. The sheet used in this operation is accordingly flexible in all three dimensions, referred to hereafter as plastic sheets. Readily available materials may be used for these sheets, which may be themselves premanufactured. Fabrics such as found in hairnets or nylon stockings, as well as polymeric materials of sufficient flexibility to deform in situ upon placement on wet paint, may be advantageously applied in sheet form according to the present invention. Preferably, plastic polymeric sheets such as those commonly used for food storage are used. Most preferably these polymeric sheets are made of polyethylene in very thin clear continuous sheets which may be cut to the size of sufficient surface area to cover the surfaces of the target article. Also, multiple sheets or applications of sheets may be used. For example, a webbed nylon sheet of fabric may be applied, then a plastic sheet, or the two may be applied simultaneously to form the imprinted surface. It is important that at least some areas of black lacquer are exposed to create the most visually effective contrast in the final product.

Once the chaotically deformed iridescent coat 3 is dried, a layer of translucent color paint is applied, sufficient to cover substantially all features of the iridescent coat. These translucent color paints are conventionally referred to as "candy colors" and are available in a wide variety of colors. Preferably a bright color such as candy apple red is used in a layer of approximately twice the thickness of the base coat. The paint used is preferably an enamel, and most preferably a urethane acrylic enamel. This layer will be referred to as the color coat 4, and is applied such that a substantially streamlined surface is produced upon drying. The preferred application method is accordingly spraying.

The color coat 4 is allowed to dry. A clear coat 6 is then applied of sufficient thickness to seal and protect the underlying coats. Preferably, this coat is between about twice and four times as thick as the base coat. Most preferably, clear coat 6 is uniform and approximately three times as thick as the base coat. Any protective clear coating material may be advantageously used in the present invention. Preferred clear coats are urethanes, including urethane acrylic enamels. Upon drying, the clear coat may be finished as desired to provide a smooth outer surface.

The resultant .product of this process is a multilayered nonuniform coating on surfaces which is substantially smooth on the exterior. The coating is in even contact with the underlying surface of the coated article and provides both a decorative and protective facade. Where the translucent color layer overlies the iridescent layer, the translucent color, depending on the height of the layer over the underlying iridescent paint at any given point, will produce various shades and intensities of the chosen color, as well as a metallic sheen. Where the translucent color layer overlies only the base coat of black lacquer, the appearance will remain black, but transformed from the flat lacquer tone to a warmer semigloss tone. Because the instant process uses the randomizing effect of a highly flexible sheet to produce the intended effect, the need for artistically designing the effect is removed. Further, since the deformation and impression of the iridescent paint is randomly performed in situ, and the conformation of the flexible sheet is not completely predictable, each resulting pattern will be unique.

It is to be understood that the present invention is not limited to the sole embodiment described above, but encompasses any and all embodiments within the scope of the following claims.

We claim:

1. A process for simulating chaotic patterns on the surface of articles by creating thereupon a nonuniform multilayered coating comprising the sequential steps:

a) applying a base coat of dark color to said surface;
b) allowing said base coat to dry;
c) applying an iridescent coat to said base coat;
d) applying a flexible sheet to said iridescent coat before said iridescent coat is dry;
e) immediately removing said flexible sheet;
f) allowing the remaining iridescent coat to dry;
g) applying a translucent color coat;
h) allowing said translucent color coat to dry; and
i) applying a clear coat;

wherein said flexible sheet is deformable in three dimensions and deforms in situ without any change in temperature.

2. The process according to claim 1, wherein said flexible sheet is composed of a plastic material selected from polyethylene and nylon.

3. The process according to claim 1, which further comprises the preparatory steps:

i) cleaning said surface of said article; and
ii) abrading said surface;

wherein steps i) and ii) are performed prior to step a).

4. The process according to claim 1, wherein said base coat is black lacquer.

5. The process according to claim 1, wherein said iridescent coat is a silver or gold in color.

6. The process according to claim 1, wherein said iridescent coat is applied as an enamel paint.

7. The process according to claim 1, wherein said translucent·color coat is applied as an enamel paint.

8. The process according to claim 1, wherein said clear coat is applied as a clear urethane paint.

9. The process according to claim 6 or claim 7 wherein said enamel paint is a urethane acrylic enamel paint.

10. The process according to claim 1, wherein said applying of said base coat, said iridescent coat, said transparent coat, and said clear coat is performed with spraying means.

11. The nonuniform multilayered coating which is the product of the process according to claim 1.

* * * * *